United States Patent [19]
Amsel

[11] Patent Number: 6,017,601
[45] Date of Patent: Jan. 25, 2000

[54] ALLERGEN-BARRIER COVER

[76] Inventor: Allan D. Amsel, 1726 E. 22$^{nd}$ St., Brooklyn, N.Y. 11229

[21] Appl. No.: 09/014,689

[22] Filed: Jan. 29, 1998

[51] Int. Cl.$^7$ .................................................. B29D 22/00
[52] U.S. Cl. ........................ 428/36.1; 442/382; 442/392; 442/400; 442/401; 5/490; 5/500; 5/501; 5/502; 156/73.1; 156/308.2; 156/308.4; 383/63; 383/109
[58] Field of Search .......................... 428/36.1, 76, 198; 5/490, 500, 501, 502; 442/382, 392, 400, 401; 156/73.1, 308.4; 383/63, 109

[56] References Cited

U.S. PATENT DOCUMENTS

| | | | |
|---|---|---|---|
| 4,691,372 | 9/1987 | Erden ......................................... | 383/63 |
| 5,050,256 | 9/1991 | Woodcock .................................. | 5/699 |
| 5,321,861 | 6/1994 | Dancey et al. .............................. | 5/482 |

*Primary Examiner*—Christopher Raimund
*Attorney, Agent, or Firm*—Oppedahl & Larson LLP

[57] ABSTRACT

An improved allergen-barrier cover for completely surrounding an allergen-carrier article, such as bedding, is provided. The cover is formed from a multilayer fabric such as an SMS fabric that allows passage of air, but blocks the passage of allergens and liquid water. This fabric is formed into an enclosure by thermally welding any seams necessary to provide a enclosure which completely encases the allergen-carrier article except for an opening sufficient to allow insertion of the allergen-carrier article into the enclosure. The cover also includes a closure in the form of a plastic seal made up of two portions: a first portion having at least two parallel ridges spaced apart from one another by a first distance and a second portion comprising at least two parallel grooves spaced apart from one another by the same distance as the parallel ridges and sized to receive the at least two parallel ridges in sealing engagement. The first portion of the closure is melt-bonded to a first portion of the opening in the enclosure and the second portion of the closure is melt-bonded to a second portion of the enclosure such that the enclosure and the closure, when sealed, cooperate to provide an allergen-barrier cover that completely surrounds the enclosed allergen-carrier article without openings of a size sufficient to allow the passage of dust mites.

17 Claims, 2 Drawing Sheets

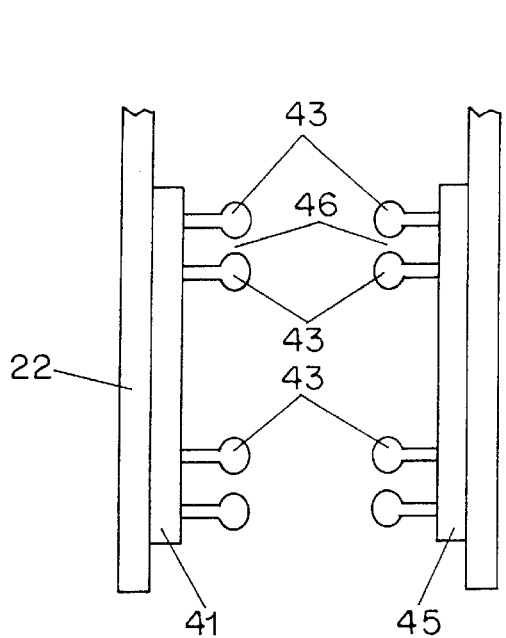
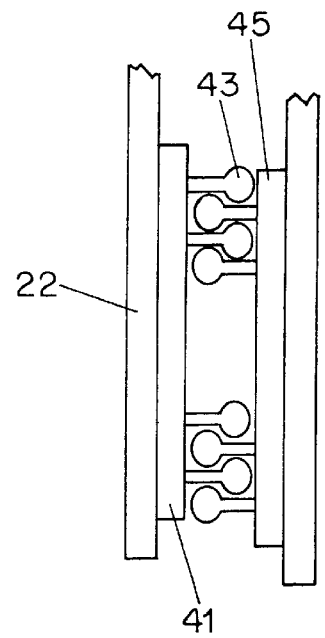
FIG. 4A　　　　FIG. 4B
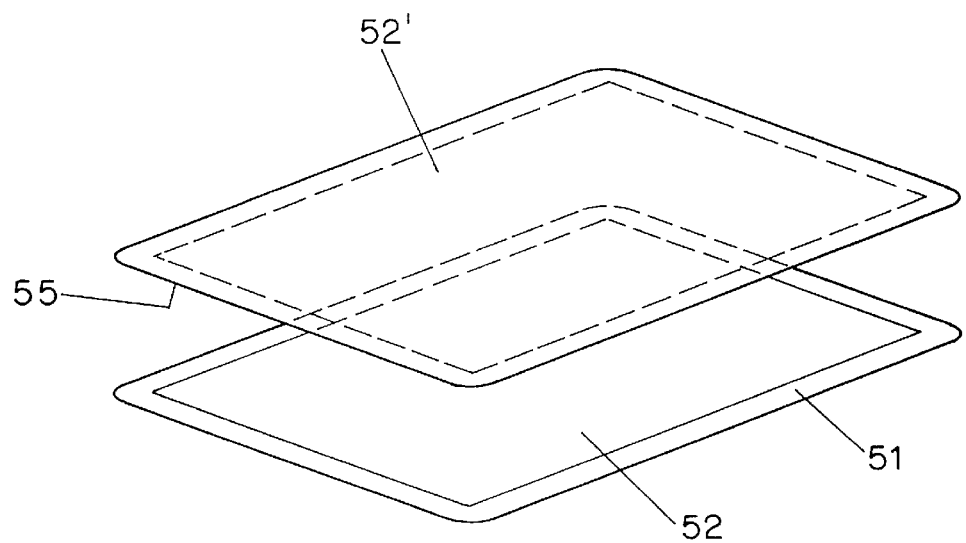
FIG. 5

ALLERGEN-BARRIER COVER

BACKGROUND OF THE INVENTION

This application relates to allergen-barrier covers for bedding and other articles which harbor dust mites and other household allergens. It is now generally accepted that dust mites, dust mite feces and other microscopic allergens found in bedding and upholstered furniture are a significant cause of many asthmatic and allergic reactions in the home. See, Walshaw et al., *Quarterly J. Med.* 58: 199–215 (1986). To reduce exposure to such allergens, various suggestions have been made for covering bedding in covers which act as a barrier to the passage of allergens.

U.S. Pat. No. 5,050,256 discloses an allergen-barrier bedding cover made from a coated fabric. The fabric is said to have a pore size of less than 10 microns to prevent the passage of dust mites. The fabric is sewn to form the cover and the seams are sealed with an additional coating of polyurethane.

U.S. Pat. No. 5,321,861 discloses a protective cover for upholstered or padded articles, made from a microporous ultrafilter material having still smaller pores of less than 0.5 microns. To eliminate possible leakage of allergens through the seams or zipper closure, these covers are constructed using high frequency welding, and the zipper is covered by an adhesive tape. The use of an adhesive tape over the zipper is cumbersome for real usage, particularly in a bedding cover which may need to be removed and washed frequently. Thus, it would be desirable to have a cover which acted as a highly effective allergen barrier while at the same time providing easy removal for washing as necessary. It is an object of the present invention to provide covers which meet this need.

SUMMARY OF THE INVENTION

The present invention provides an improved allergen-barrier cover. The cover comprises an enclosure for completely surrounding an article of bedding or other items that may harbor dust mites and other allergens, and a closure for sealing the enclosure. The enclosure is formed from a multilayer fabric comprising a layer of meltblown fibers formed into a mat sandwiched between two layers of spunbond fibers formed into mats. The three layers are thermally bonded together at intervals, for example using a patterned calendaring roll, to produce a fabric that allows passage of air, but blocks the passage of allergens and liquid water. This fabric is formed into the enclosure by melt-bonding welding any seams necessary to provide a cover which completely encases the allergen-carrier article except for an opening sufficient to allow insertion of the allergen-carrier article into the enclosure. The closure used in the invention is a plastic zipper seal made up of two portions: a first portion having at least two parallel ridges spaced apart from one another by a first distance and a second portion comprising at least two parallel grooves spaced apart from one another by the same distance as the parallel ridges and sized to receive the at least two parallel ridges in sealing engagement. The first portion of the closure is melt-bonded to a first portion of the opening in the enclosure and the second portion of the closure is melt-bonded to a second portion of the enclosure such that the enclosure and the closure, when sealed, cooperate to provide an allergen-barrier cover that completely surrounds the enclosed article without openings of a size sufficient to allow the passage of dust mites.

BRIEF DESCRIPTION OF THE DRAWINGS

FIGS. 4A and 4B show an second alternative arrangement for a closure in the cover of the invention; and FIG. 5 shows a duvet cover in accordance with the invention.

DETAILED DESCRIPTION OF THE INVENTION

The present invention relates to an allergen-barrier covers for bedding and other items that may harbor dust mites and other allergens. Specific, non-limiting examples of such items include but are not limited to such articles as mattresses, pillows, bolsters, duvets, quilts, articles of clothing, including for example the insulating lining of jackets, sleeping bags, furniture, furniture cushions, cushions used in boats and recreational vehicles and any other upholstered or padded item which may harbor dust mites and related allergens. Such items are referred to in the specification and claims of this application as "allergen-carrier articles."

Figure 1:
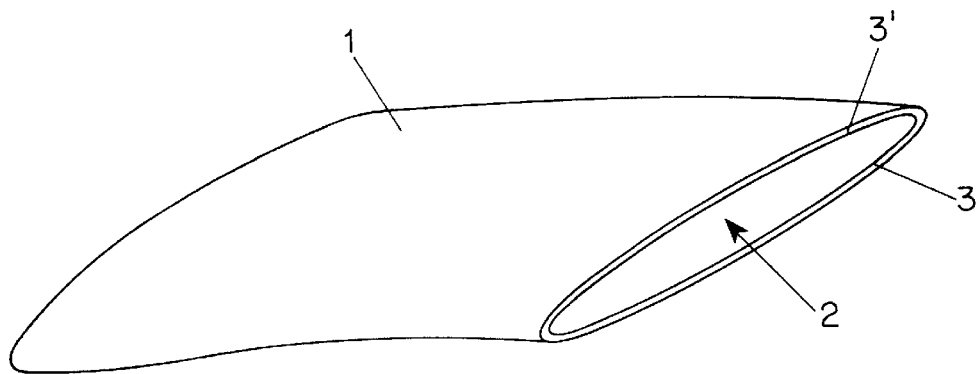
FIG. 1 shows a pillow cover in accordance with the invention.

The cover of the invention can be described as being composed of two component parts. Thus, as shown in FIG. 1, a pillow cover in accordance with the invention is made up from a fabric enclosure 1 which has an opening 2 for permitting insertion of a pillow into the cover. Along the edges of the opening 2 are closure portions 3 and 3' which cooperate to seal the cover.

The fabric used to make the enclosures of the present invention is a breathable fabric which allows the passage of air and water vapor, but which blocks the passage of liquid water and dust mites and related allergens. Air permeability is particularly important in the cover of the invention, since an air impermeable fabric, when combined substantially air-tight seal would result in air being trapped. This would result in the cover itself acting as a balloon, for example, rather than conforming to the shape of the article being covered. Thus, for purposes of the present invention, the cover preferably permits passage to air at a rate of greater than about 250 l/m$^2$/min, more preferably about 400 to 700 l/m$^2$/min (measured on a MINIBUCK calibrator with a 7" by 7" fabric square).

Such a fabric can be made as a three-layer composite of the type known in the textile industry as an SMS fabric. This fabric is a sandwich of a layer of meltblown material between two layers of spunbonded material. The layers are then bonded together at intervals, for example using a heated calendar roll with embossing patterns or using ultrasonic welding to tack the layers together.

The meltblown layer in the center of an SMS composite is prepared by spinning fibers of a melted polymer, such as a polypropylene resin, through a high velocity air jet. The resulting fibers have lengths on the order of 5–15 inches and have an average diameter of 2–4 microns. These fibers are formed into a mat which has a very high filtration efficiency, and which is capable of excluding dust mites and related allergens. This mat, however, has very poor tensile strength because of the short length of the fibers and has a tendency to abrade when placed next to skin or rubbed, and therefore cannot be effectively used alone as an allergen barrier fabric.

To overcome this weakness, the meltblown mat is sandwiched between two mats formed from spunbonded material. The spunbonding process is similar to meltblowing, except that a lower velocity air jet is used to produce fibers of greater length (generally 20–30 feet) and diameter (25–35 microns on average). These fibers are collected as a mat and bonded together with heat and pressure.

When two layers of spunbonded material are melt bonded at intervals around a center layer of meltblown material, a composite fabric results which has the strength imparted by the spunbonded layers combined with the filtration ability of the meltblown layer. This is the case because the composite is melted together only at intervals. In the spaces between the melted bond-points, the layers retain their original permeability to air and water vapor, thus providing a breathable but water resistant allergen barrier.

A preferred material for making the fabric used in the enclosure of the present invention is polypropylene. A suitable fabric of this type is sold under the trademark MAGIC FABRIK 28. It will be appreciated, however, that other polymers or polymer blends which can achieve similar filtration while providing a stable fabric might also be used. Natural fibers might also be included in the mat layers.

An advantage of using a fabric of this type is the ability to form the enclosure of the invention using welded rather than sewn seams. Sewing seams results in the formation of holes in the barrier fabric, and thus compromises the integrity of the barrier. Polypropylene SMS sandwich fabrics and other similar materials can be melt-bonded using a heated roll or an ultrasonic bonding process, or any other process which will result in the formation of bonded seams to assemble the enclosure of the invention without the introduction of holes into the barrier. It will be appreciated that some forms of enclosures may be made without the need for the formation of seams of any type. For example, a duvet cover could be made as shown in FIG. 5 from two separate flat sheets of fabric joined on all for sides with the closure as described more fully below.

The second important aspect of the present invention is the closure which is used to seal the allergen-barrier cover once the allergen-carrier article is inserted. Conventional allergen-barrier bedding covers sold today are generally provided with a fine coil zipper as a closure mechanism. Even with fine coils, however, the zipper has holes which are large compared to the size of dust mites and related allergens. Further, the zipper may be made from fabric which lacks any effective barrier properties and may include at least one very large hole at the top end of the zipper coils. Thus, the entire closure mechanism in these covers is a compromised region that provides no little or no effective barrier to the passage of dust mites and related allergens. The importance of this failure in the barrier properties was recognized, for example in U.S. Pat. No. 5,321,861 discussed above, but no workable and effective solution has been provided prior to the present invention.

Figure 2A:
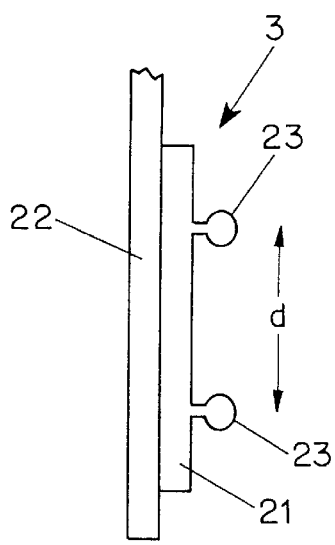
FIGS. 2A and 2B show the closure of a cover in accordance with the invention.
Figure 2B:
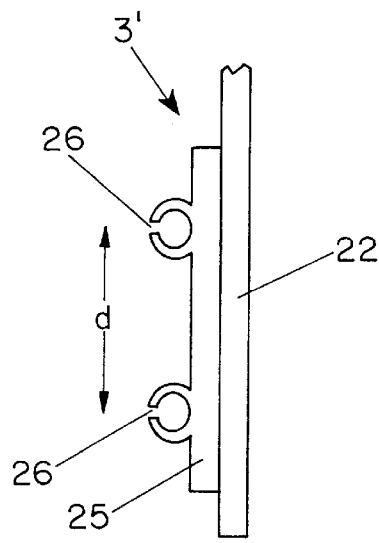
Figure 3:
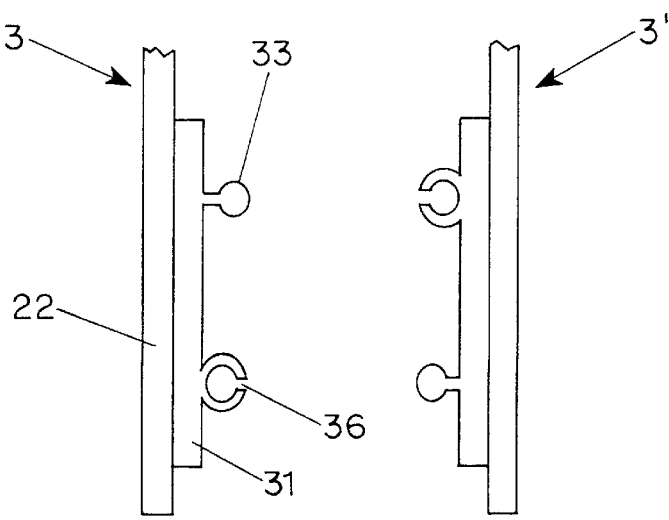
FIG. 3 shows an alternative arrangement for a closure in the cover of the invention.

Referring again to FIG. 1, the closure of the present invention is a two-part closure 3 and 3', the two parts being disposed on opposing edges of the opening 2 in the enclosure 1. FIGS. 2A and 2B show a close up view of the two closure portions 3 and 3'. In FIG. 2A, a first portion 21 of the closure is shown affixed to the fabric 22 of the enclosure. The first portion 21 of the closure has two parallel ridges 23 formed thereon which are spaced apart by a distance "d". In FIG. 2A, a second portion 25 of the closure is shown affixed to the fabric 22 of the enclosure. The second portion has two parallel grooves 26 formed thereon which are also spaced apart by the same distance "d." The grooves 26 are sized to receive the ridges 23 in a sealing engagement to form an allergen-barrier, and preferably substantially air-tight seal along the full length of the closure. An alternative arrangement of the grooves and ridges is shown in FIG. 3. In this case, the closure portion 31 has a groove 36 and a ridge 33 oriented to complement a ridge and groove on the other closure portion 35.

The closure is suitably formed from a flexible, plastic material which permits multiple cycles of opening and closing without loss of sealing engagement. Press-together closures of this type are generally known from their use in thin-film thermoplastic bags, for example sandwich or food storage bags, although in this application it is conventional to use only a single ridge and groove rather than at least two parallel ridges and grooves as in the present invention. The ridges and grooves may be molded integrally or may be added to a preformed sheet. A method for making closure of this type is disclosed in U.S. Pat. No. 3,462,332 which is incorporated herein by reference. Suitable materials for construction of the closure of the invention include thermoplastics such as polyethylene. The closure may also include a slider which facilitates sealing and unsealing of the ridges and grooves, provided that the slider does not compromise the barrier properties of the closure.

The closure portions 21 and 25 are affixed to the fabric 22 of the enclosure 1 in a manner which leaves no voids or holes which would compromise the barrier properties of the cover when sealed. This may be accomplished using an adhesive or, where the materials of the closure and the fabric are compatible, by thermally bonding the closure to the fabric using a heated roll or ultrasonic welding.

FIGS. 4A and 4B shows another alternative form for the closure of the present invention in separated and closed positions, respectively. In this embodiment, the ridge and groove structure of the first portion 41 and the second portion 45 are the same, each being formed of two closely-spaced ridges 43 which between them form a groove 46. This permits the use of the same material or of a continuous run of material for the two portions of the closure.

FIG. 5 shows another embodiment of the invention which is particularly suited for duvet, quilt and pillow covers. In this embodiment, the closure portions 51 and 55 are placed on facing surfaces of two separate pieces of fabric 52 and 52' which will form the enclosure. The closures 51 and 55 extend about the entire perimeter of the pieces of fabric 52 and 52'.

The present invention may be practiced with a number of variations from the specific embodiment shown in the figures and described above without departing from the scope and intent of the invention. Such variations include, but are not limited to variations in the specific shape of the sealing ridges and grooves of the closure, the specific shape of the enclosure to conform to the shape of any given allergen-carrier article, and the location and number of openings in the enclosure.

The invention will now be defined by the following claims for which protection is sought.

I claim:

1. An allergen-barrier cover comprising:
   (a) an enclosure for completely surrounding an allergen-carrier article to be covered,
   said enclosure being formed from a multilayer fabric comprising a layer of meltblown fibers formed into a mat sandwiched between two layers of spunbond fibers formed into mats, and said three layers being thermally bonded together at intervals, wherein the fabric allows passage of air, but blocks the passage of allergens and liquid water, and said enclosure being formed by melt-bonding any seams necessary to provide an enclosure which completely encases the allergen carrier article except for an opening sufficient to allow insertion of the allergen-carrier article into the enclosure; and (b) a closure comprising a first portion having at least two parallel ridges or grooves spaced apart from one another by a first distance and a second portion comprising at least two parallel ridges or grooves spaced apart from one another by the first distance, each of said grooves being sized to receive the ridge of the other portion of the closure in sealing engagement;

wherein said first portion of the closure is bonded to a first portion of the opening in the enclosure and the second portion of the closure is melt-bonded to a second portion of the enclosure such that the enclosure and the closure, when sealed, cooperate to provide an allergen-barrier cover that completely surrounds the enclosed allergen-carrier article without openings of a size sufficient to allow the passage of dust mites.

2. The allergen-barrier cover of claim 1, wherein the meltblown and spunbonded layers of the enclosure are made from polypropylene.

3. The allergen-barrier cover according to claim 1, wherein the seams in the enclosure are formed by ultrasonic welding.

4. The allergen-barrier cover of claim 3, wherein the meltblown and spunbonded layers of the enclosure are made from polypropylene.

5. The allergen-barrier cover of claim 1, wherein the first and second portions of the closure are melt-bonded to the fabric of the enclosure.

6. The allergen-barrier cover according to claim 5, wherein the seams in the enclosure are formed by ultrasonic welding.

7. The allergen-barrier cover of claim 6, wherein the meltblown and spunbonded layers of the enclosure are made from polypropylene.

8. The allergen-barrier cover of claim 5, wherein the meltblown and spunbonded layers of the enclosure are made from polypropylene.

9. A method of making an allergen-barrier cover for an allergen-carrier article comprising the steps of:

(a) forming an enclosure for completely surrounding an allergen-carrier article to be covered from a multilayer fabric to provide an enclosure that completely encases the allergen-carrier article except for an opening sufficient to allow insertion of the allergen-carrier article into the enclosure, said fabric comprising a layer of meltblown fibers formed into a mat sandwiched between two layers of spunbond fibers formed into mats, and said three layers being thermally bonded together at intervals, wherein the fabric allows passage of air, but blocks the passage of allergens and liquid water, wherein any seams necessary to the formation of the enclosure are formed by melt-bonding; and (b) bonding a closure to the enclosure, said closure comprising a first portion having at least two parallel ridges or grooves spaced apart from one another by a first distance and a second portion comprising at least two parallel ridges or grooves spaced apart from one another by the first distance, each of said grooves being sized to receive the ridge of the other portion of the closure in sealing engagement, wherein said first portion of the closure is bonded to a first portion of the opening in the enclosure and the second portion of the closure is bonded to a second portion of the enclosure such that the enclosure and the closure, when sealed, cooperate to provide an allergen-barrier cover that completely surrounds the enclosed allergen-carrier article without openings of a size sufficient to allow the passage of dust mites.

10. The method of claim 9, wherein the meltblown and spunbonded layers of the enclosure are made from polypropylene.

11. The method according to claim 9, wherein the seams in the enclosure are formed by ultrasonic welding.

12. The method of claim 11, wherein the meltblown and spunbonded layers of the enclosure are made from polypropylene.

13. The method of claim 9, wherein the first and second portions of the closure are melt-bonded to the fabric of the enclosure.

14. The method according to claim 13, wherein the seams in the enclosure are formed by ultrasonic welding.

15. The method of claim 14, wherein the meltblown and spunbonded layers of the enclosure are made from polypropylene.

16. The method of claim 13, wherein the meltblown and spunbonded layers of the enclosure are made from polypropylene.

17. An allergen-barrier cover comprising:

(a) an enclosure for completely surrounding an allergen-carrier article to be covered, said enclosure being formed from fabric that allows passage of air, but blocks the passage of allergens and liquid water, said enclosure being sized to completely encase the allergen carrier article except for an opening sufficient to allow insertion of the allergen-carrier article into the enclosure; and (b) a closure comprising a first portion having at least two parallel ridges or grooves spaced apart from one another by a first distance and a second portion comprising at least two parallel ridges or grooves spaced apart from one another by the first distance, each of said grooves being sized to receive the ridge of the other portion of the closure in sealing engagement;

wherein said first portion of the closure is bonded to a first portion of the opening in the enclosure and the second portion of the closure is melt-bonded to a second portion of the enclosure such that the enclosure and the closure, when sealed, cooperate to provide an allergen-barrier cover that completely surrounds the enclosed allergen-carrier article without openings of a size sufficient to allow the passage of dust mites.

\* \* \* \* \*